United States Patent [19]
Heinzen

[11] Patent Number: 5,553,866
[45] Date of Patent: Sep. 10, 1996

[54] CARTRIDGE-TYPE LIP SEAL WITH REMOVABLE SPACER

[75] Inventor: Stephen R. Heinzen, Arlington Heights, Ill.

[73] Assignee: Freudenberg-NOK General Partnership, Plymouth, Mich.

[21] Appl. No.: 346,684

[22] Filed: Nov. 30, 1994

[51] Int. Cl.⁶ ................................ F16J 15/32
[52] U.S. Cl. .................. 277/9.5; 277/11; 277/35; 277/51; 277/225
[58] Field of Search .............. 277/1, 9–11, 35, 277/47, 51, 152, 153, 225

[56] References Cited

U.S. PATENT DOCUMENTS

| | | | |
|---|---|---|---|
| 2,090,913 | 8/1937 | Duritza | 277/10 |
| 3,095,715 | 7/1963 | Stokely | 277/153 |
| 3,114,558 | 12/1963 | Rhoads et al. . | |
| 3,120,959 | 2/1964 | Jensen et al. . | |
| 3,612,547 | 10/1971 | Kan | 277/153 |
| 4,083,567 | 4/1978 | Thumm | 277/153 |
| 4,114,898 | 9/1978 | Bainard et al. | 277/9 |
| 4,226,426 | 10/1980 | Messenger . | |
| 4,815,884 | 3/1989 | Halliday, Jr. et al. | 277/10 |
| 4,856,794 | 8/1989 | Boyers et al. . | |
| 4,936,591 | 6/1990 | Romero . | |
| 4,989,882 | 2/1991 | Warner et al. | 277/11 |
| 5,004,248 | 4/1991 | Messenger et al. . | |
| 5,015,001 | 5/1991 | Jay . | |
| 5,052,695 | 10/1991 | Curtis . | |
| 5,123,661 | 6/1992 | Johnston et al. | 277/153 |
| 5,183,269 | 2/1993 | Black et al. . | |
| 5,201,529 | 4/1993 | Heinzen | 277/153 |
| 5,209,499 | 5/1993 | Ruff, Jr. et al. . | |
| 5,292,199 | 3/1994 | Hosbach et al. | 277/35 |

Primary Examiner—Scott W. Cummings
Attorney, Agent, or Firm—Dinnin & Dunn, P.C.

[57] ABSTRACT

A seal assembly for use in providing a dynamic fluid seal between a relatively rotating housing and shaft. The seal assembly eliminates the need for either a fixed internal thrust bearing or seal assembly contact with an adjacent inner bearing race. The seal assembly includes a spacer which provides an axial gap between a sleeve and seal support during installation. The spacer transmits the axial shaft installation load through the seal assembly into the housing. Once the seal assembly is installed, the spacer is removed, whereby the gap between the sleeve and seal support eliminates heat due to contact friction and reduces seal degradation.

22 Claims, 2 Drawing Sheets

CARTRIDGE-TYPE LIP SEAL WITH REMOVABLE SPACER

BACKGROUND OF THE INVENTION

1. Field of the Invention

The present invention relates generally to a seal assembly used to maintain a fluid seal between two relatively rotatable elements such as a shaft and housing, and more particularly to a seal assembly including a spacer used to position individual seal components during assembly and installation.

2. Description of the Related Art

Unitized seal assemblies are typically used to seal fluids between a rotating shaft supported, typically through a bearing assembly, by a housing. The seal assembly normally includes a seal element and a sleeve. The seal element includes a rigid member which supports a flexible seal lip made from rubber, some other suitable elastomeric material, or a resinous material such as polytetrafluoroethylene or PTFE. In normal use, the seal element engages the housing and remains stationary during operation. The sleeve is typically a tubular member disposed about the rotating shaft and provides a dynamic sealing surface. During operation, the seal lip engages the sealing surface to form a fluid seal.

It is preferable that the components be preassembled; i.e., unitized, prior to shipment to avoid handling and contamination damage. Preassembly of the seal components also assists in final assembly and use of the seal. During final assembly; i.e., insertion at the shaft/housing interface, the seal assembly is press-fit into the housing after which the shaft is press-fit into the seal assembly. Thus, the seal assembly must absorb the axial load necessary to install the shaft.

Under proper operating conditions, it is necessary to maintain a small axial space or gap between the seal element and sleeve; i.e., a noncontacting relationship between the rigid member or seal support and an outwardly extending portion of the sleeve. Such a gap prevents generation of frictional heat during operation of the seal assembly as it is known that heat reduces seal life. As a significant axial load is applied to the seal during installation, which may result in a metal to metal or some other contacting relationship between the seal element and sleeve, it is necessary to provide a load transmitting device to transmit the installation load from the shaft to the housing. Such a device enables installation of the seal assembly and shaft while preventing a contacting relationship between the seal element and sleeve, thus eliminating frictional heat during use of the seal assembly.

In order to prevent contact between the seal element and sleeve, prior unitized seals have used elastomeric bumpers or nibs for axially spacing the seal element and sleeve. One problem with such a system is that rubber or elastomeric thrust bumpers are sometimes compressed as a result of the large axial mounting forces. While it is the intent that such elastomeric bumpers or nibs wear away during the initial phase of seal operation to provide clearance and thus minimal contact, the initial wearing away period can result in significant frictional heat which reduces the life of the seal assembly.

Some seal assembly mounting procedures require that the sleeve stop on an inner bearing race. Mounting procedures of this type require tight control of axial stack up tolerances in order for the seal to function properly. When using an elastomeric bumper or nib, compression of the elastomeric bumper can result in improper seal assembly alignment. It is known to provide a seal assembly with a thrust bumper manufactured from a non-compressible material different from that used to form the seal lip. One type of such a seal assembly utilizes a thrust bumper made from a resilient, high temperature resistant, lubricous, plastic material. While such a thrust bumper overcomes the problem of compressibility and provides for axial separation of the sleeve and the seal element, the seal assembly requires an additional element which increases both the cost and manufacturing time of the seal assembly.

While the preceding approaches may have some limited use, it is desired to have a unitized seal assembly which eliminates the need for either a fixed internal thrust bumper or contact with an adjacent inner bearing race. Further, a seal assembly is desired that provides an axial gap between the sleeve and the seal element. The gap prevents contact between the seal element and the sleeve, either metal to metal or elastomeric to metal, thus eliminating frictional heat and seal degradation during initial start up and use of the seal.

Additionally, prior art seal assemblies are difficult to ship and handle; they compose two individual pieces with the seal element simply slipped over the sleeve. It is desirable to have a seal assembly which is unitized; i.e., the components are preassembled prior to shipping. Such an assembly facilitates installation while properly maintaining an axial clearance between the sleeve and the seal element.

SUMMARY OF THE INVENTION

Accordingly, the present invention is a unique seal assembly for use in sealing two relatively rotating parts, such as a shaft and a housing. The invention eliminates the need for either a thrust bumper or contact with an inner race of an adjacent bearing. The seal assembly includes a spacer element which fills an axial gap between the sleeve and the seal element during installation. In general, the seal assembly includes a seal element, sleeve and a spacer. The seal element includes a rigid member or support portion and a seal lip. The seal element is typically inserted within the housing. The sleeve is mounted to the shaft and includes a sealing surface for engaging the seal lip. A spacer, formed of a plastic material such as a polyamide or polyethylene, having a ring shape including several radially inward projections, is disposed between the seal element and the sleeve. The radially inward projections fill the gap between the seal element and the sleeve and transmit the installation load from the shaft through the seal assembly to the housing. The spacer is removed prior to shaft rotation. It should be appreciated that removal of the spacer leaves a gap between the seal element and the sleeve.

A further advantage includes providing a snap-fit mechanism to secure the sleeve and seal element together unitizing or locking the sleeve and seal element in a spaced relationship prior to installation. After the seal assembly is installed, the spacer is no longer needed and removal does not reduce, but instead enhances the function of the seal assembly. In fact, removal is necessary for the seal assembly to function properly.

It should be appreciated that the subject invention provides a means for installation of a seal assembly in a housing, after which a shaft is press-fit into a sleeve of the seal assembly to complete the installation procedure. The spacer properly maintains an axial gap between the seal element and the sleeve after assembly to minimize friction between parts of the seal assembly to eliminate heat during operation. Additionally, a seal assembly according to the present invention, not only enables proper installation, but also allows subsequent removal of the shaft and sleeve combination from the seal assembly without damage to the seal element or the sleeve. Such a seal assembly permits reuse of the seal element and sleeve versus other unitized seals which are typically damaged during disassembly and must be replaced.

DESCRIPTION OF THE PROPOSED EMBODIMENT(S)

Figure 1:
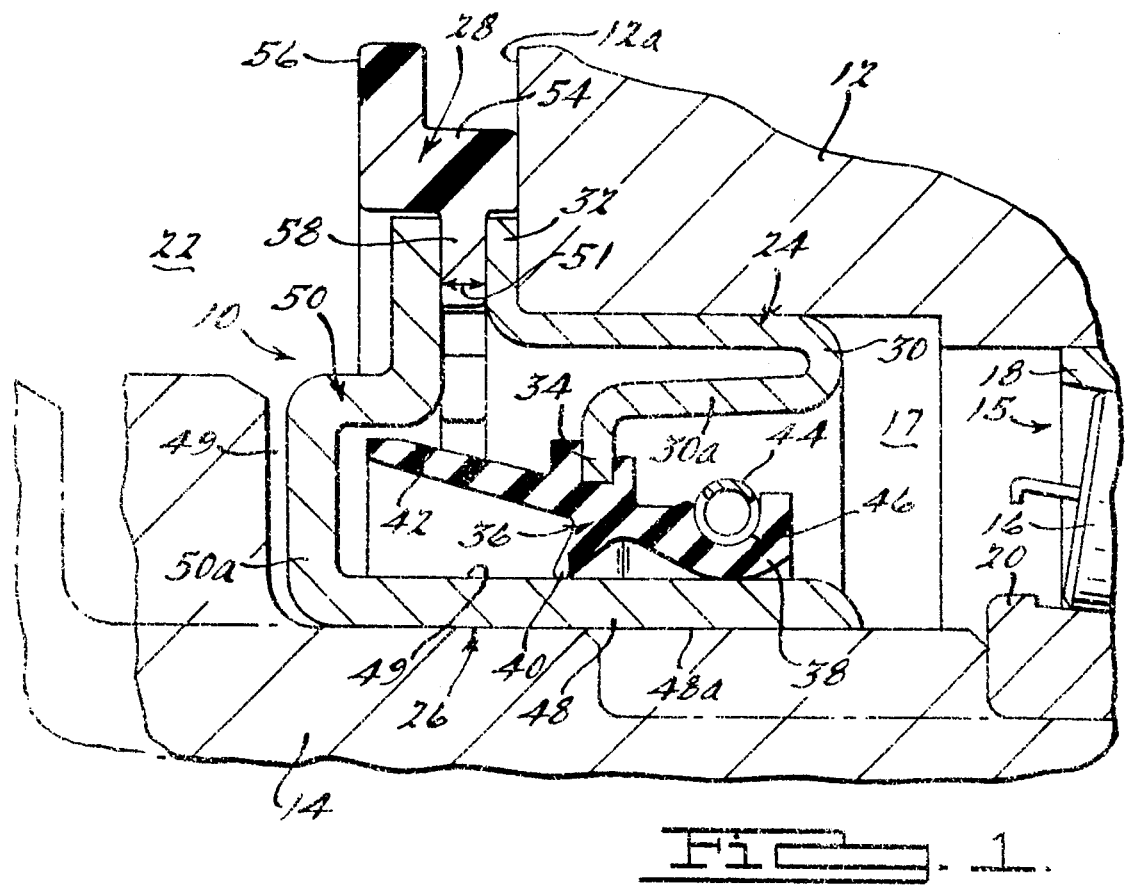
FIG. 1 is a cross-sectional side view of a seal assembly according to an embodiment of the invention, including a shaft and housing.

Referring to the drawings and more particularly FIG. 1, a seal assembly 10 is shown in use between a housing 12 and a shaft 14. As illustrated in FIG. 1, a bearing assembly 15, including bearing member 16 and bearing races 18 and 20, supports the shaft 14 within the housing 12. The seal assembly 10 prevents leakage of lubricating fluid (not shown) from the closed or fluid side 17 to the open or air side 22.

The seal assembly 10 includes a seal element seen generally at 24, a sleeve seen generally at 26, and a spacer seen generally at 28. The seal element 24 includes a substantially U-shaped rigid member or seal support 30 having an outwardly extending annular flange portion 32. The annular flange 32 contacts a surface 12a of the housing 12. One leg 30a of the U-shaped member 30 includes an inwardly extending support flange 34. A one-piece elastomeric seal lip 36 is attached to the inwardly projecting support flange 34 of the seal element 24. The seal lip could also be formed from a resinous material such as polytetrafluorethylene. The elastomeric seal lip includes a primary seal lip 38, a secondary seal lip 40, and an outwardly extending flange seal 42. A garter spring 44 is seated in a channel 46 on the primary seal lip 38 and provides a radially inwardly directed force to ensure contact of the primary seal lip 38 with the sealing surface 49 of the sleeve member 26.

As shown in FIG. 1, the sleeve 26 includes an axially extending inner portion 48 which extends along and defines an inner bore 48a. The sleeve 26 is press-fit over the shaft member 14. An annular ring portion 50 extends outward from the axially extending inner portion 48. The ring portion 50 provides an additional seal element; i.e., a face which protects the elastomer seal lip 36. As illustrated in FIG. 1, a gap or space 49 exists between the shaft 14 and a shoulder portion 50a of the sleeve 26. The gap 49 is the result of axial stack-up in tolerance when mounting the shaft 14. As the sleeve 26 is present in the shaft 14 and positioned by the spacer 28 it will be properly positioned with respect to the seal element 24 regardless of the final position of the shaft 14.

Figure 2:
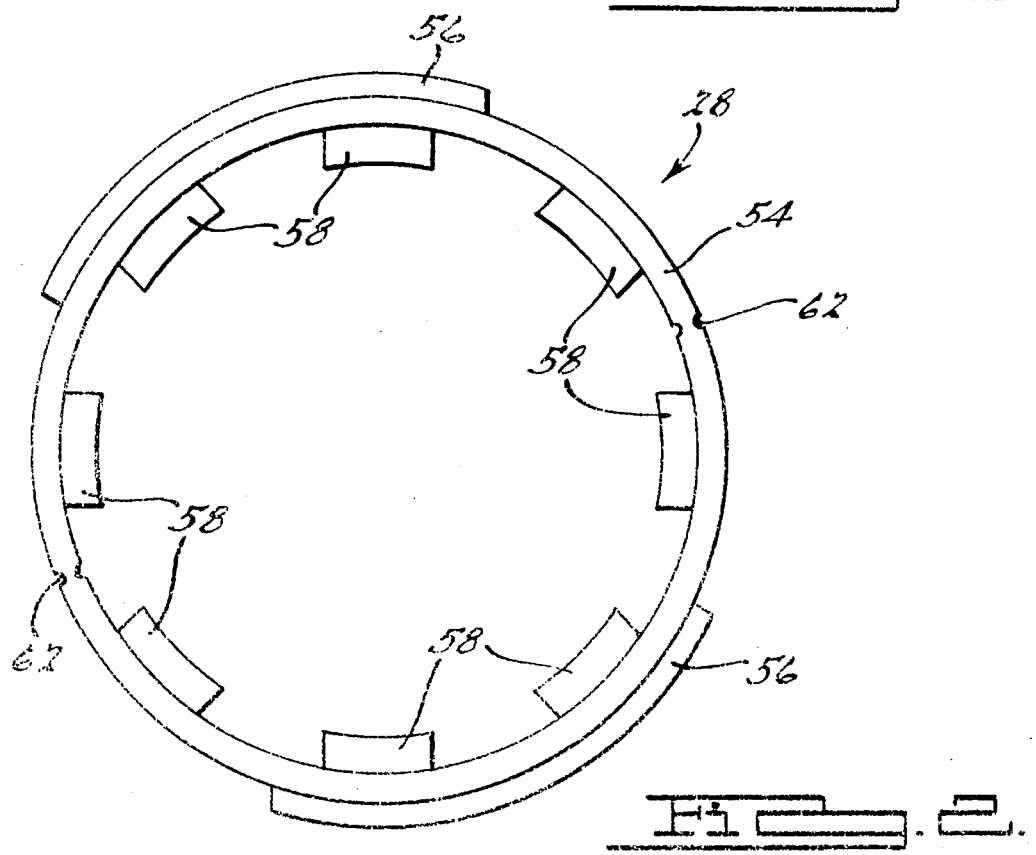
FIG. 2 is a view of a spacer element used in connection with the seal assembly of FIG. 1.

Referring to FIG. 2, a spacer 28 according to the present invention is shown. The spacer 28 includes a ring portion 54. Grip portions 56 extend outwardly from the ring portion 54. Radial projections 58 on the ring 54 extend inwardly; i.e., toward the center of the ring 54 and fill the axial gap or separation 51 between the sleeve 26 and the seal element 24. During installation of the shaft 14, the radial projections 58 transmit the installation load from the shaft 14, through the sleeve 26 and the seal element 24 into the housing 12. In FIG. 1, the shaft 14, as shown in dotted lines, indicates the position of the shaft 14 during installation. As the shaft 14 is installed, a press-fit joint occurs between the shaft 14 and the inner bore 48a of the sleeve 26. Absent the spacer 28, the outwardly extending annular ring portion 50 of the sleeve 26 would contact the annular flange 32 of the seal element 24. Contact between the respective parts during operation of the seal assembly would create heat due to friction between the contacting parts, resulting in seal degradation.

It should be appreciated that the spacer 28 is preferably made of a plastic material able to withstand axially loading, such as polyamide or polyethylene. As set forth previously, the radial projections 58 transmit the axial installation load through the seal assembly 10 to the housing 12. Once the seal assembly 10 is installed, the spacer 28 is removed prior to shaft 14 rotation. To facilitate removal of the spacer 28, a reduced cross-sectional area 62 on the ring portion 54 provides a convenient location to cut the spacer 28 using a wire cutter or other simple hand tool. Severing the reduced cross-sectional area 62 splits the spacer 28 into two sections. An operator then grips the gripping portions 56 and pulls the spacer 28 out of the gap 51 between the seal element 24 and the sleeve 26. Additionally, removal of the spacer 28 is beneficial in that it allows for removal of the shaft 14 with the sleeve 26 in place. The shaft/housing assembly can subsequently be reassembled with the seal element 24 and sleeve 26 already positioned, properly maintaining the appropriate axial gap 51 without any seal assembly 10 damage.

Figure 3:
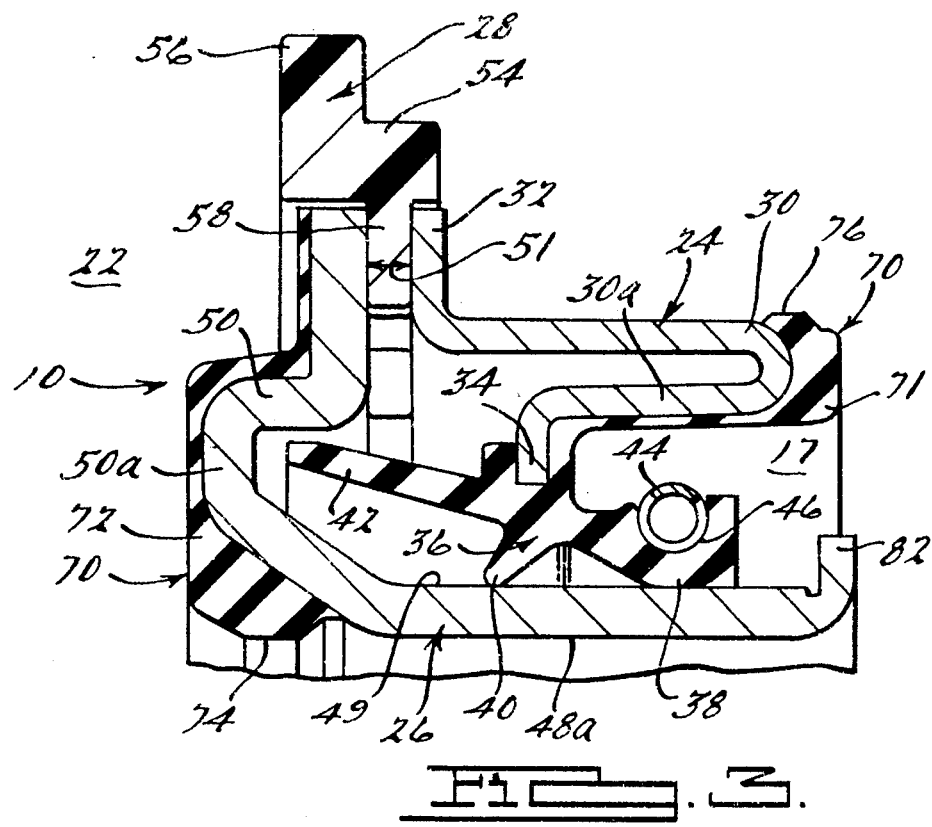
FIG. 3 is a sectional side view of a first alternative embodiment of the seal assembly of FIG. 1.

In FIG. 3, the seal assembly 10 of FIG. 1 has been modified to include additional elastomeric or rubber gaskets 70 at the inside 71 and outside portions 72 of the seal assembly 10. The additional gaskets prevent fluid from migrating along either the shaft/seal interface 74 or the housing/seal element interface 76. Additionally, one end of the sealing surface 49 of the sleeve 26 is formed as an outwardly extending flange portion 82 which provides a unitizing mechanism to prevent disassembly of the seal assembly 10. As illustrated in FIG. 3, the garter spring 44 provides a radially compressive force through the elastomeric seal lip 36. The flange portion 82 acts as a stop which prevents travel and corresponding disengagement of the seal lip 36 with the sealing surface 49 of the sleeve 26, preventing the seal element 24 from being axially displaced. Such an arrangement allows fabrication of a unitized seal assembly which may be packaged and shipped in a preassembled state.

Figure 4:
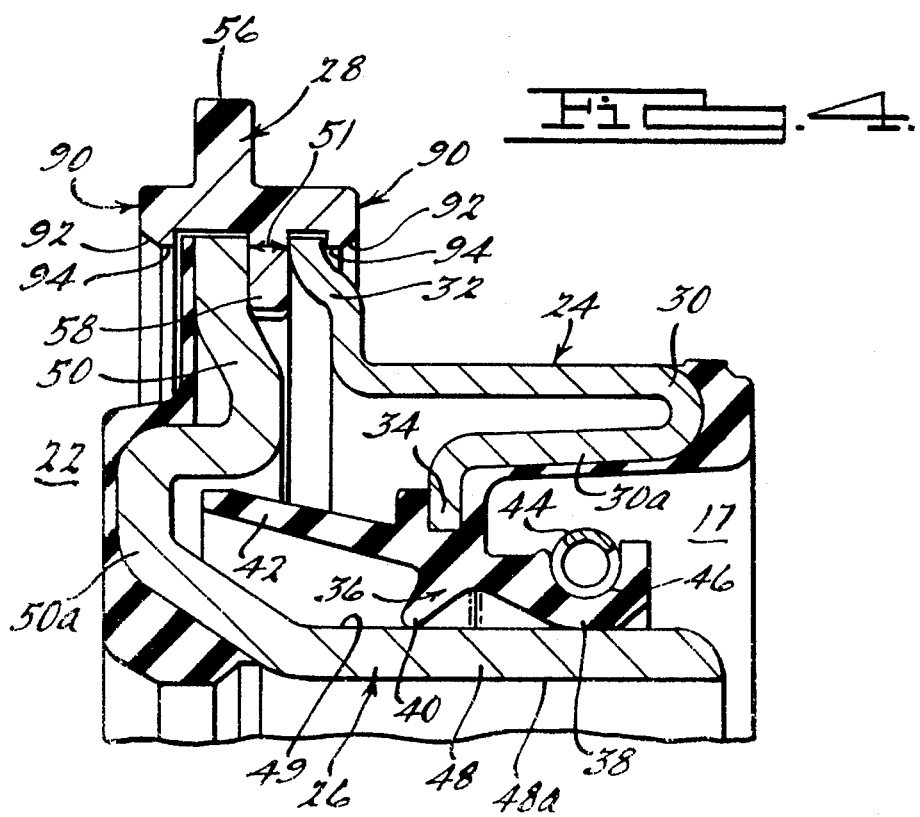
FIG. 4 is a sectional side view of a second alternative embodiment of the seal assembly of FIG. 1.

Referring now to FIG. 4, FIG. 4 discloses a seal assembly 10 according to a second alternative embodiment of the present invention. As shown in FIG. 4, the spacer 28 includes a snap-fit mechanism, seen generally at 90 which holds the sleeve 26 and seal element 24 in position. The spacer 28 prevents separation of the seal 24 and sleeve 26 prior to its removal. The snap-fit mechanism includes cam surfaces 92 and projections 94. The cam surfaces 92 act in conjunction with the projections 94 to securely position the sleeve 26 and seal element 24. As set forth in the previous embodiment, once the seal assembly 10 is installed, the spacer 28 is removed to leave an axial gap 51 between the seal element 24 and sleeve 26.

Accordingly, the present invention provides a unitized seal assembly 10 which eliminates the need for an internal fixed thrust bumper or contact with an adjacent bearing race. Such a device utilizes a spacer 28 placed between, and defining an axial gap 51 between the sleeve 26 and the seal element 24 during installation. The spacer 28 is positioned such that it transmits and bears the installation load during installation of the seal assembly 10. Once assembled, the spacer 28 is removed providing an axial gap 51 which prevents contact friction and corresponding frictional heat to minimize seal degradation.

What is claimed:

1. A seal assembly providing a dynamic fluid seal between a housing and a shaft having relative rotating motion therebetween comprising:

a seal element, said seal element including a support portion and a seal lip;

a sleeve, said sleeve including a sealing surface, said seal lip positioned to engage said sealing surface; and a spacer, said spacer removably positioned to provide a spaced relationship between said support portion and said sleeve such that removal of said spacer prior to use of said seal assembly results in an axial gap between the support portion and the sleeve, wherein said spacer includes a ring having a plurality of inwardly radially projecting portions.

2. A seal assembly as set forth in claim 1 wherein said support portion of said seal element includes an outwardly extending flange portion which engages said housing when said seal assembly is in use;

said sleeve having a substantially tubular shape and disposed over said shaft and including an outwardly extending flange member; and said spacer positioned, prior to removal, between said outwardly extending flange of said support portion and said outwardly extending flange of said sleeve.

3. A seal assembly as set forth in claim 2 wherein the spacer includes a cam surface and a projecting portion, said cam surface and said projection portion combining to form a snap-fit mechanism, said snap-fit mechanism engaging both the outwardly extending flange of the support portion and the outwardly extending flange of the sleeve to unitize the seal assembly and prevent separation of the seal element and sleeve prior to removal of the spacer.

4. A seal assembly as set forth in claim 2 with the sleeve having an elastomer bonded to the outwardly extending flange member and extending through at least a portion of an inner diameter of said sleeve in contact with the shaft for sealing between the sleeve and the shaft.

5. A seal assembly as set forth in claim 2 with the seal element having a rubber material bonded to the support portion of said seal element and contacting the housing in at least a portion of the support portion of said seal element for sealing the static joint between the support portion and the housing.

6. A seal assembly as set forth in claim 2 wherein said seal lip is formed of a resinous material.

7. A seal assembly as set forth in claim 6 wherein said resinous material is polytetrafluorethylene.

8. A seal assembly as set forth in claim 1 wherein said spacer further includes an outwardly extending projection, said outwardly extending projection forming a gripping surface for use in removal of said spacer prior to use of the seal assembly.

9. A seal assembly as set forth in claim 8 wherein the spacer includes a reduced cross-sectional portion on said ring to facilitate removal of the ring.

10. A seal assembly as set forth in claim 1 wherein the spacer is made of plastic.

11. A seal assembly as set forth in claim 1 wherein said sleeve includes an upturned flange at one end of said sealing surface, said flange adjacent a fluid side of said seal, said flange cooperating with said seal lip to provide a unitized seal assembly.

12. A seal assembly as set forth in claim 1 with the seal element containing a radial dirt exclusion lip in addition to the seal lip.

13. A seal assembly as set forth in claim 1 with the seal element containing an axial dirt exclusion lip in addition to the seal lip.

14. A seal assembly as set forth in claim 1 with the seal element having an elastomeric material bonded to support portion of said seal element.

15. A seal assembly for use with a relatively rotating shaft and housing comprising:

a sleeve configured such that it may be disposed about said shaft, said sleeve including a outwardly extending flange member and a sealing surface;

a seal element, said seal element including a seal support and an elastomeric seal lip attached to said seal support, said seal support configured such that it engages and is secured to said housing, said seal lip engaging the sealing surface of said sleeve; and a spacer having an annular body portion, said spacer including inward radial projections, said projections initially positioned between the outwardly extending flange member of said sleeve and an outwardly extending flange of said seal support, said spacer element providing an axial clearance between said sleeve and said seal support wherein said spacer transmits the installation load and is removed after installation of said seal assembly and prior to use of said seal assembly.

16. A seal assembly as set forth in claim 15 wherein said spacer includes a reduced cross-sectional portion to facilitate spacer removal.

17. A seal assembly as set forth in claim 15 wherein said spacer further includes a grip portion extending outwardly from said annular body portion, said grip portion for use in removing the spacer after installation of the seal assembly.

18. A seal assembly as set forth in claim 15 wherein said spacer includes said annular body portion having opposite sides, said sides including inwardly directed lock projections and cam surfaces, said lock projections and cam surfaces combining to form a deflectable snap-fit mechanism which engages and secures the sleeve and seal support to the spacer to provide an assembled, unitized seal assembly.

19. A seal assembly as set forth in claim 15 wherein said sleeve includes an upturned flange at an end of said sealing surface adjacent a fluid side of said seal assembly, said inner flange cooperating with said seal lip to provide a unitized seal assembly.

20. A method of installing a seal assembly to provide a dynamic fluid seal between a relatively rotating housing and shaft comprising:

providing a seal assembly including a seal element having a support portion and a seal lip, a sleeve, and a spacer disposed between said seal element support portion and said sleeve;

installing said seal assembly in said housing;

installing said shaft in said sleeve such that said shaft extends through said sleeve whereby the installation load is transmitted through the sleeve, spacer and seal element to the housing; and removing the spacer from the seal assembly prior to use of the seal assembly.

21. A method of installing a seal assembly according to claim 20 wherein the method includes the step of severing the spacer to facilitate removal of the spacer.

22. A method of installing a seal assembly according to claim 21 wherein the method includes the step of severing the spacer at a reduced cross-sectional area of the spacer;

gripping the spacer at an outwardly extending grip projection mounted on the spacer; and removing the spacer from the seal assembly to leave an axial gap between the sleeve and the support portion of the seal element.

* * * * *